Figure 1:
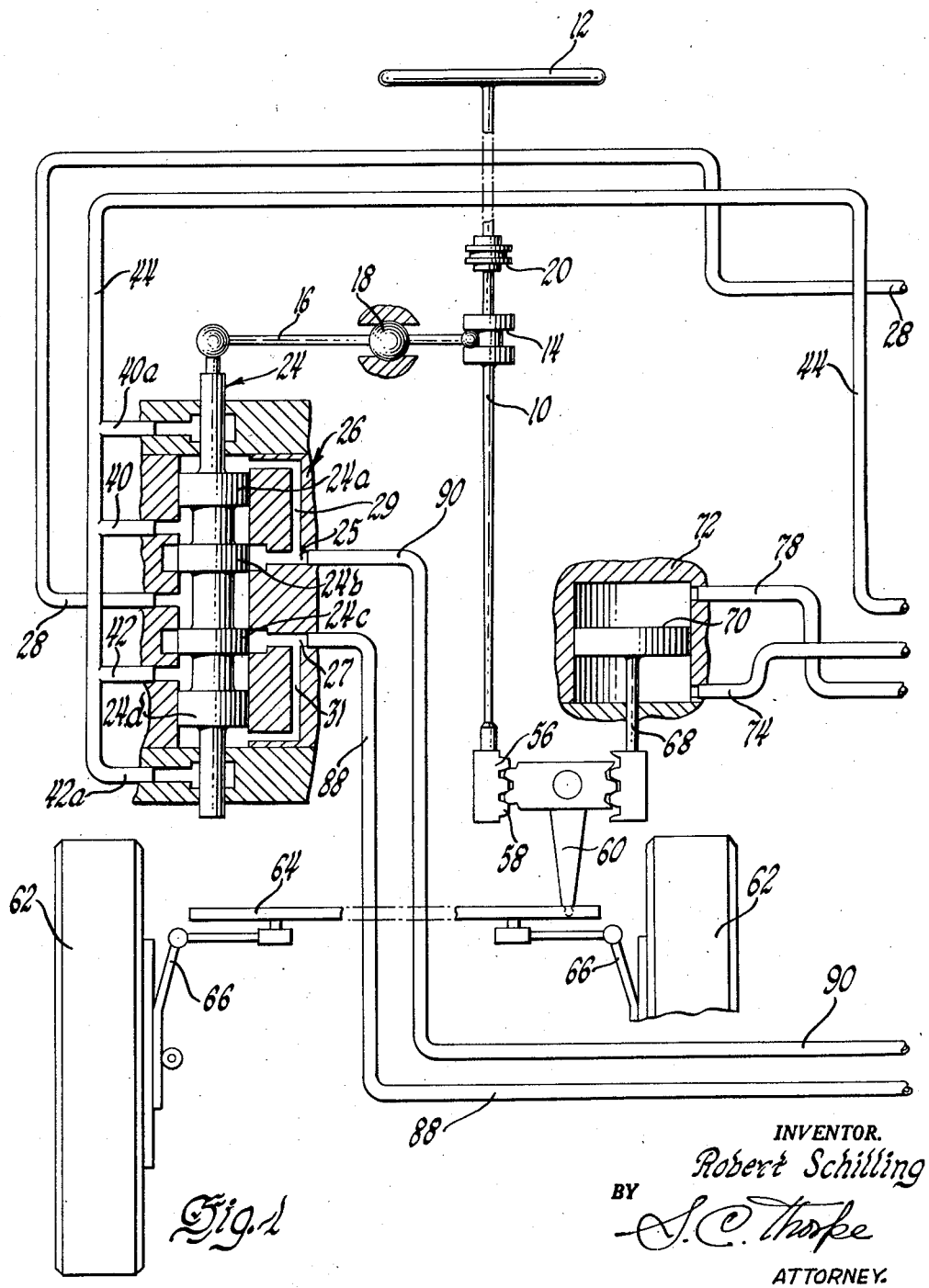

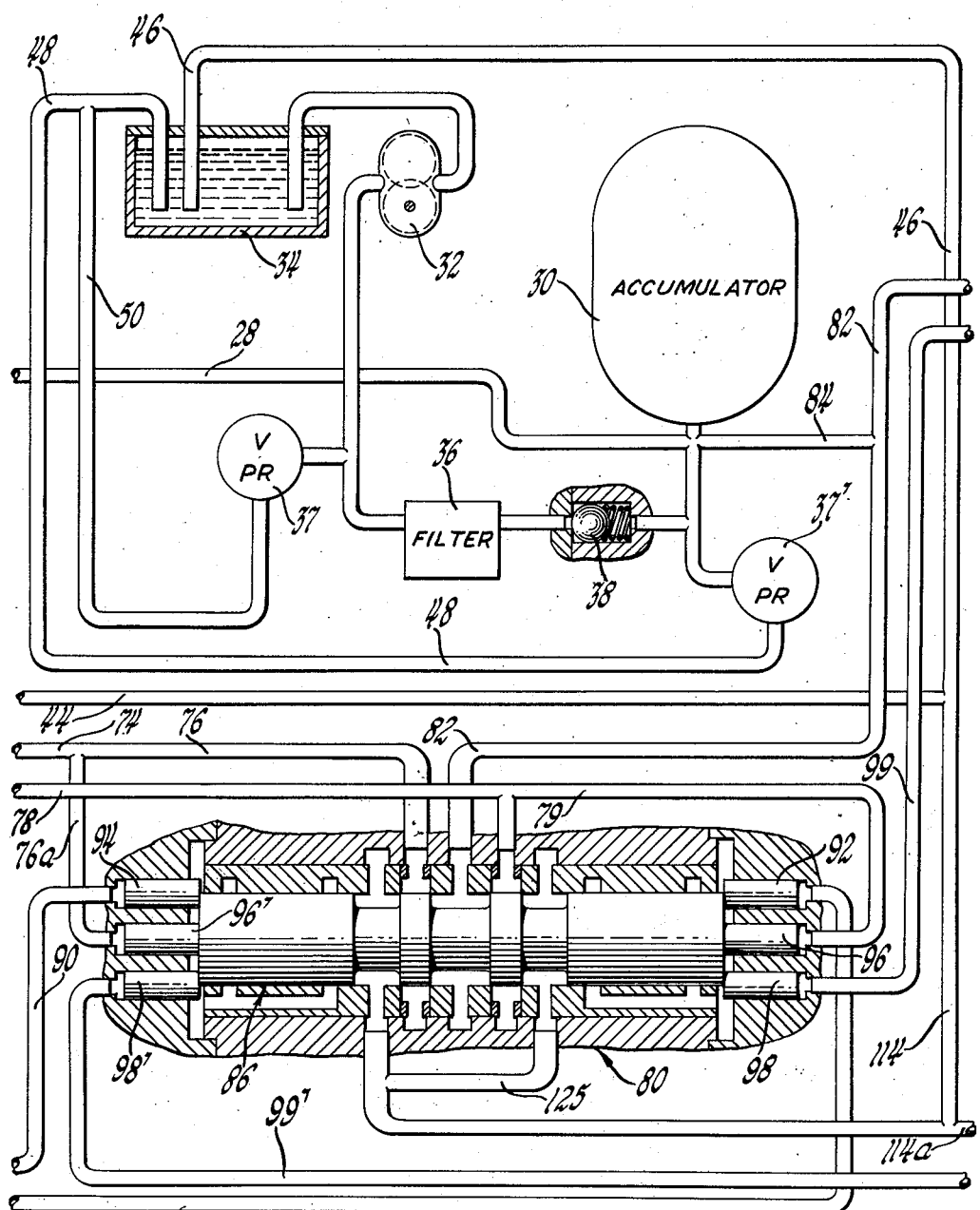

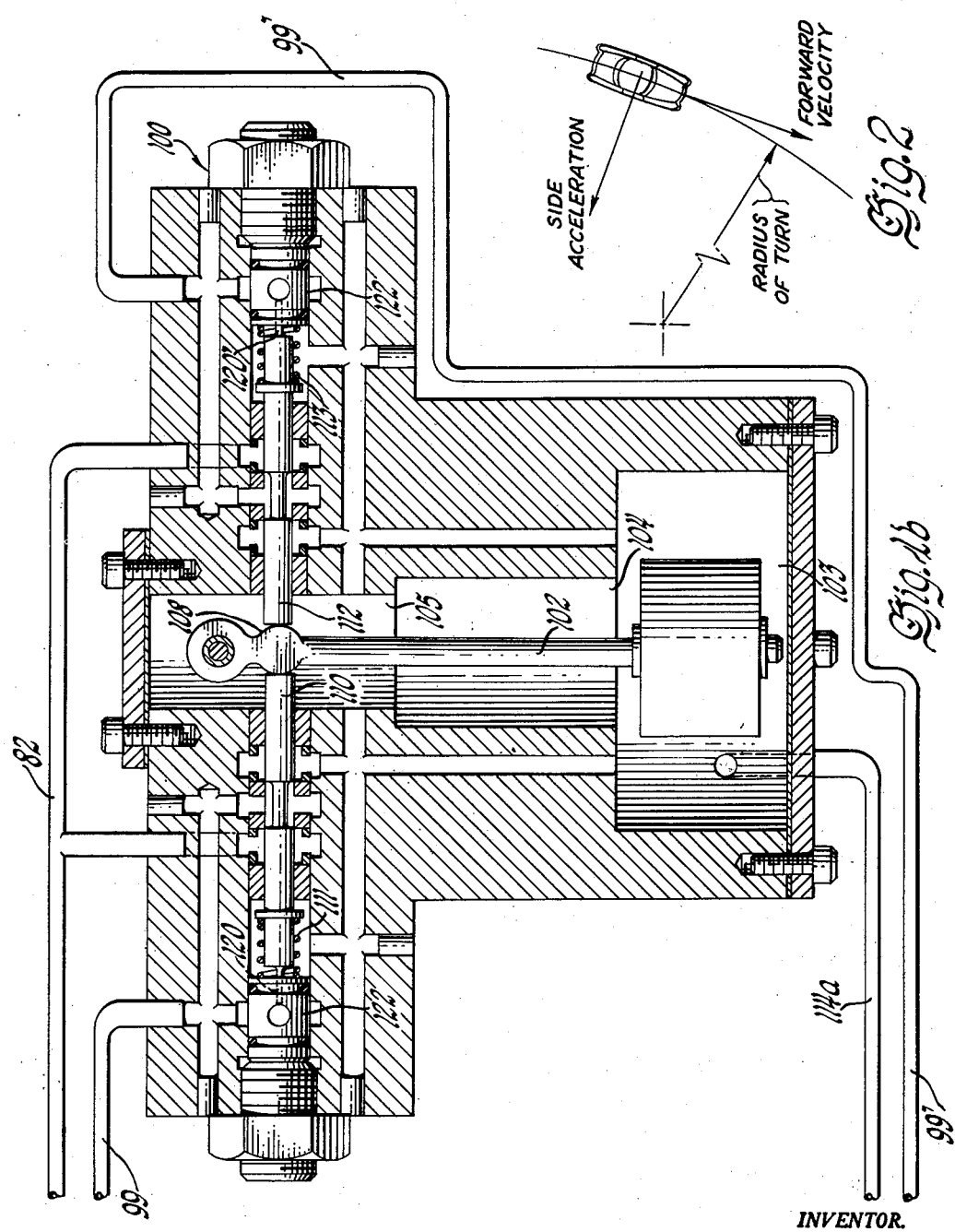

United States Patent Office 2,902,104
Patented Sept. 1, 1959

2,902,104

HYDRAULIC POWER STEERING SYSTEM WITH ASSOCIATED LATERAL ACCELERATION CONTROL MEANS

Robert Schilling, Bloomfield Hills, Mich., assignor to General Motors Corporation, Detroit, Mich., a corporation of Delaware Application April 13, 1956, Serial No. 578,067

10 Claims. (Cl. 180—79.2)

This invention concerns automotive vehicles and more especially relates to improvements in the steering and handling characteristics of such vehicles, particularly when equipped with power steering apparatus.

It is generally recognized among automotive engineers that the operator of an automotive vehicle steers, in part, by "feel" derived through his hands at the steering wheel and, in part, through visual observation of differences between course heading and desired heading of the vehicle.

Driving skill is perhaps best measured in terms of the speed with which the individual reacts and responds to changing conditions affecting vehicle heading. Using this test, it is manifest on the basis of empirical observation alone, that the variation in driving skill among drivers as a whole, or for that matter among drivers in any selected group, excepting possibly experienced test and racing drivers, is very substantial indeed. Clearly, if some means could be found which would operate, in effect, to quicken the receptivity and responsiveness of the driver, whatever his inherent skill, the result would be highly beneficial.

The present invention aims to provide such means by feeding to the driver at the steering wheel force reactions not hitherto sensed in motor vehicle operation.

A further object is to provide steering control means which tend to keep the vehicle on a straight course, i.e. to reduce lateral acceleration of the vehicle to zero.

Another and more specific object of the invention is to provide a system of apparatus for application to a power steered vehicle, which apparatus in operation modulates the action of the power steering control means to achieve the results sought.

There are two conditions of motor vehicle operation which particularly illustrate the need for this invention. The first is the incipient skid condition where the rear wheels of the vehicle are tending to break away, and the second is that obtaining when the vehicle encounters a strong, sudden, transverse wind gust. In the former case, the road forces normally sensed at the steering wheel as "feel" tend to disappear leaving the driver with no front wheel position information, and in the latter case the road load on the front wheels develops too late for the driver to make the necessary steering correction. The present invention answers fully to both of these conditions. Thus, in either case it immediately indicates to the driver through the steering wheel the direction the dirigible wheels are turned, permitting the speediest possible recovery.

The free-control (hands-off) stability of the vehicle is markedly improved by the present invention. Indeed, in certain emergency situations, as a skid on ice, it is not infrequently best that the steering wheel be released entirely so that the vehicle will be permitted to straighten up automatically.

The modulation of the power steering control means to attain the desired effects is accomplished according to the invention by hydro-mechanical means incorporated in a system otherwise particularly characterized in that the actuation of the power steering control means is effected by fluid pressure.

A preferred embodiment of the invention is illustrated by the accompanying drawings which will be referred to in the further description and in which:

Figures 1, 1a, and 1b collectively illustrate a system wherein the power for steering is provided by a hydraulic motor under the control of a spool type valve and wherein the modulation of the valve according to the invention is achieved by an accelerometer of a particular type; and Figure 2 illustrates forces acting upon a vehicle in the negotiation of a right turn, the radius of which remains constant.

Referring first to Figure 1, the numeral 10 indicates a steering shaft carrying the usual steering wheel 12 at its upper end. The shaft is enlarged and annularly grooved at 14 to accommodate the end of a lever 16 fulcrumed at 18. Thus, on axial movement of the shaft, induced by steering reaction as later explained, lever 16 will rotate on its pivot in a direction determined by the direction of axial movement of the shaft.

A coupling 20 serves to take care of any alignment problems and may be so designed that the reactionary axial movement of the shaft 10 is limited to the portion thereof below the coupling.

Lever 16 will be seen as connected at its end opposite the portion 14 with the spool component 24 of a torque valve 26. Such valve is suitably ported to receive pressure fluid via a line 28 from an accumulator 30 (Fig. 1a) served by a pump 32 drawing from a reservoir 34. The pump may be powered from the crankshaft of the engine of the vehicle, for example. Filter 36 and relief valves 37, 37' serve an obvious purpose, while ball check valve 38, which is loaded in a direction toward the pump, as by a spring, operates to block the flow of fluid from the pump discharge line except during the accumulator loading cycle.

Pump 32 may be either a constant or variable displacement pump. In the event a constant displacement pump is used a suitable by-pass mechanism should be employed appropriately controlled by discharge pressure, so that with the ball 38 seated the suction and discharge sides of the pump are interconnected. Pumps so equipped are well known and hence nothing further in point needs to be stated here.

Reverting to the torque valve 26, it will be seen that the same comprises in addition to the pressure port communicating with the line 28 a pair of exhaust ports corresponding to lines 40, 42 connecting with the return line 44 to the sump or reservoir 34 via line 46 (Fig. 1a). Sump 34 on occasion may also receive fluid from the relief valves 37, 37' via lines 48 and 50, respectively.

The spool 24 of the torque valve comprises four lands 24a, 24b, 24c, and 24d. Lands 24b and 24c control the flow of pressure fluid to the outlet ports 25 and 27, while lands 24a and 24d by virtue of the passageways 29 and 31 in the valve body serve to provide a resistance to movement of the spool. Thus, should the spool 24 be displaced upwardly, a portion of the fluid flowing toward port 25 will be diverted via the passageway 29 to the chamber above the land 24a where it reacts against the land. Similarly, on downward movement of the spool 24, a portion of the fluid flowing toward the port 27 is diverted to the chamber below the land 24d via the passage 31, there to react against the latter land. Lines 40a and 42a which connect to the exhaust line 44 provide egress to fluid bleeding past the guide stems of the spool 24.

Before continuing with the description of the hydraulic circuit, the mechanical parts of the steering system beyond the steering shaft 10 should perhaps first be identified. Included among these parts is a ball nut 56, the rack teeth 58 of which provide for a suitable connection with a pitman arm 60. Such arm is shown as connected with the dirigible wheels 62 of the vehicle through a parallelogram steering linkage comprising a drag link or cross tie rod 64 and steering knuckle arms 66. The construction and modus operandi of the ball nut 56 will be made clear by reference to Hawkins Patent 2,267,425, for example.

Pitman arm 60 in addition to its connection with the ball nut, will be seen as operably connected to the shaft 68 of a power piston 70 confined within a cylinder 72. Fluid for the actuation of the piston 70 is supplied to the cylinder 72 via lines 74 and 78, communicating with lines 76 and 79 (Fig. 1a), respectively, extending to a control valve 80. This valve, which may also be designated a "summing" valve, for reasons which will subsequently become apparent, connects with the accumulator 30 via lines 82 and 84 and comprises a spool component 86 actuated by fluid under pressure, the fluid for this purpose being received from the previously mentioned torque valve 26 via lines 88 and 90. These latter lines terminate behind plungers 92 and 94, respectively, housed within the body of the control valve 80 and adapted to bear against the spool 86. It will be understood that there may be a plurality of the plungers 92 and 94 arranged so that the force applied against the spool 86 will be suitably distributed.

In addition to the plungers 92 and 94, the control valve 80 comprises a series of plungers 96, 96' and a third series of plungers 98, 98'. Plungers 96 are adapted to bear against the spool 86 to displace the same leftward by pressure fluid entering behind the plungers from line 79. Similarly plungers 96' are adapted to bear against the spool to shift the same rightward by pressure fluid admitted behind the plungers from line 76.

Pressure fluid for the actuation of the plungers 98 and 98' is derived from an accelerometer 100 (Fig. 1b) via lines 99 and 99'. This device includes a weighted pendulum 102 rounded at 108 where the pendulum is engaged by a pair of plungers 110, 112 loaded by springs 111, 113, respectively. Most suitably the action of the pendulum is damped by fluid confined within the chambers 103, 104, and 105, the fluid being supplied to such chambers as will be later apparent.

Each of the plungers 110, 112 carries at its outer end an extension 120, 120' of reduced diameter entering the bore of a feed back plug 122. The right-hand plug 122 opens to a passageway serving line 99', while the left-hand plug 122 will be seen as opening to a passageway communicating with line 99.

Before describing the operation of the system of Figures 1, 1a, and 1b, it should be noted that the location of the accelerometer in the vehicle is not critical. However, it is preferred that the same be located, with the pendulum depending, of course, along the center line of the vehicle so that the pendulum swings in a plane transverse to the center line. The pendulum may be mounted under the front seat or at the bottom of the radiator support bracket, for example.

The accelerometer pendulum and all of the other parts as they appear in Fig. 1b are disposed in neutral position. Assuming a right turn, as illustrated by Fig. 2, the operator of the vehicle rotates the steering wheel 12 in the indicated direction. Due to the resistance to the turning of the dirigible wheels 62, shaft 10, or the portion thereof below the coupling 20, is caused to move axially upward. This results in downward displacement of the spool 24 of the torque valve 26 by virtue of the lever connection 16. As a consequence, pressure fluid from the accumulator 30 enters line 88 and thence passes back of the plungers 92 to shift the spool 86 of the control valve leftward (Fig. 1a). Accordingly, lines 82 and 76 become interconnected through the valve 80 causing the setting up of a pressure differential across the piston 70 in favor of the lower chamber of the cylinder 72. The upward movement of the piston 70 swings the pitman arm 60 rightward as required to power steer the dirigible wheels in the desired direction (Fig. 2).

Once lines 82 and 76 have become connected through the control valve 80, continued leftward movement of the spool is resisted by the pressure developing behind the plungers 96'—note branch line 76a. These plungers, in other words, tend on a right turn to re-center the spool 86 in the valve housing. Plungers 96 act similarly on a left turn.

As previously mentioned herein, the downward movement of the spool 24 is accompanied by flow of pressure fluid to the chamber below the land 24d via the passage 31. The developing pressure in such chamber tends to resist further displacement of the spool and is sensed at the steering wheel as "feel." That this feel is reflective of the actual steering resistance should be clear when it is considered that the pressure providing it corresponds to the pressure behind the plunger 92 and when it is further considered that the latter pressure must overcome the pressure behind the plunger 96' which corresponds to the pressure in the energized chamber of the power cylinder 72.

With the spool 86 of the valve 80 displaced to the left during a right turn, the upper chamber of the cylinder 72 and the chamber behind the centering plungers 96 are open to exhaust line 114—the exhaust being through the valve 80 and a branch line 125.

Taking up now the effect of the accelerometer 100 it will, of course, be immediately seen that the pendulum 102, which as carried by the car is disposed with its axis in a vertical plane, will tend to swing outward on the right turn (Fig. 2). Accordingly, plungers 110 and 112 (Fig. 1b) become displaced to the right. This places pressure line 82 in communication with the line 99' and also operates to interconnect lines 99 and line 114a—114 terminating at the reservoir 34.

The rightward displacement of plunger 112 is further marked by the development of a pressure in the bore of the right-hand plug 122 which is open to the passageway serving line 99'. This pressure reacts against the end of the extension 120' tending to re-center the plunger and the pendulum.

With line 99' connected to line 82 the developing pressure behind the plungers 98' of the control valve 80 functions as a resistance to the leftward displacement of the spool 86, this resistance being additive with respect to that provided by the centering plunger 96'. Thus, a part of the pressure behind the plunger 92 tending to hold the valve spool 86 displaced to the left is dissipated in overcoming the opposing pressure behind the plunger 98', the result being that the valve spool 86 is returned slightly rightward and the amount of fluid passing to the power cylinder via line 76, 74 for the actuation of piston 70 is reduced. Now to compensate for the consequent reduction of assistance against the road load the driver effort at 12 must manifestly increase, leading to further axial displacement of valve spool 24 via lever 16. Such additional displacement of the spool 24 allows more fluid for actuation of plungers 92, so that spool 86 is again displaced leftward to its position before the lateral acceleration disturbance.

When the vehicle is being parked or maneuvered slowly in close quarters, there is, of course, little if any swinging of the pendulum 102, hence the power steering assist is maximum for any given feel piston size (lands 24a, 24b). The maximum resistance owing to the accelerometer (or the minimum steering assist) obtains during a fast turn of small radius when it is desirable that the operator be most fully apprised of the forces tending to cause break-away from the intended course.

There remains for discussion the action on the accelerometer as a safety contrivance and as a device for providing free control stability. In this connection, let us assume that the vehicle in Figure 2 is traveling at an excessive speed and has begun to spin. In other words, the center of turning has moved ahead of the front wheels of the vehicle and usually closer, to the right side of the vehicle. Correction of a spin in the indicated direction, of course, requires prompt turning of the dirigible wheels to the left. Since the resisting pressure set up by the accelerometer is acting in a direction tending to steer the dirigible wheels to the left, and since the force tending to maintain the pendulum displaced is magnified under the spin condition due to the increased frictional contact of the tires with the road surface, the operator instinctively and substantially instantaneously follows the lead of the accelerometer-induced pressure, quickly righting the vehicle. In short, the resisting pressure set up by the accelerometer acts in a direction tending to steer the dirigible wheels to the left, hence the operator being "force" informed, and substantially instantaneously, follows the lead of the accelerometer-induced pressure quickly stabilizing the vehicle.

In the case of a spin caused by ice, extensive over the roadway, the operator of a conventional vehicle may lose entirely his feel of the angular disposition of the dirigible wheels due to the decreased frictional contact of these wheels with the road surface—a situation prone to result in a serious mishap. This cannot happen with a vehicle equipped according to the invention, since the disposition of the dirigible wheels is telegraphed to the operator artificially through the hydraulic circuit. Actually, as has been hereinbefore suggested, the operator may remove his hands from the steering wheel altogether and allow the vehicle to right itself automatically.

The operation of the disclosed apparatus on a left turn is believed obvious from the foregoing. Thus it will be understood that the shaft 10 moves axially downwardly on a left turn against the resistance of the pressure of the fluid above the land 24a and that the power piston on the rightward displacement of the spool 86 of the control valve is forced downwardly to swing the pitman arm 60 to the left (Fig. 1). The accelerometer acts just as in the case of a right turn except that the pendulum, of course, swings oppositely (Fig. 1b) to open up the left side rather than the right side of the accelerometer valving to the pressure line 82.

I claim:

1. In an automotive vehicle comprising power steering apparatus including a source of fluid pressure, a fluid motor operably connected to a steering part and a control valve in the fluid circuit between said source and said motor, said control valve incorporating fluid pressure centering means, a manually actuated valve having fluid connection with said source and with said control valve, said manually actuated valve controlling said control valve through its fluid connection therewith and incorporating fluid pressure feel means in which the fluid pressure at any time is a function of the fluid pressure in said fluid pressure centering means, means for sensing a selected motion of the vehicle in operation, and a third valve in fluid circuit with said source and having fluid connection with said control valve, said third valve being governed by said sensing means and operating when displaced to set up a fluid pressure additive with respect to the fluid pressure in said fluid pressure centering means.

2. In an automotive vehicle comprising power steering apparatus including a source of fluid pressure, a fluid motor operably connected to a steering part and a control valve in the fluid circuit between said source and said motor, said control valve incorporating fluid pressure centering means, a manually actuated valve having fluid connection with said source and with said control valve, said manually actuated valve controlling said control valve through its fluid connection therewith and incorporating fluid pressure feel means in which the fluid pressure at any time is a function of the fluid pressure in said fluid pressure centering means, pendulum means for sensing lateral accelerations of the vehicle, and a third valve in fluid circuit with said source and having fluid connection with said control valve, said third valve being governed by said pendulum means and operating when displaced to set up a fluid pressure additive with respect to the fluid pressure in said fluid pressure centering means.

3. In an automotive vehicle comprising dirigible means and power steering apparatus functional with respect to such means, said apparatus including a source of fluid pressure, a fluid motor operably connected to said dirigible means and a control valve in the fluid circuit between said source and said motor, said control valve incorporating fluid pressure centering means, a second valve reacting to torque manually applied to turn said dirigible means and having fluid connection with said source and with said control valve, said second valve controlling said control valve through its fluid connection therewith and incorporating fluid pressure feel means in which the fluid pressure at any time is a function of the fluid pressure in said fluid pressure centering means, pendulum mean for sensing lateral accelerations of the vehicle, and a third valve in fluid circuit with said source and having fluid connection with said control valve, said third valve being governed by said pendulum means and operating when displaced to set up a fluid pressure additive with respect to the fluid pressure in said fluid pressure centering means.

4. In an automotive vehicle comprising dirigible means and a steering shaft operably connected to such means, said vehicle being equipped with power steering apparatus including a source of fluid pressure, a fluid motor operably connected to said dirigible means and a control valve in the fluid circuit between said source and said motor incorporating fluid pressure centering means, a second valve having fluid connection with said control valve and reacting to torque manually applied to turn said steering shaft, such turning being accompanied by axial displacement of said shaft and said second valve, the latter controlling said control valve through its fluid connection therewith and incorporating fluid pressure feel means in which the fluid pressure at any time is a function of the fluid pressure in said fluid pressure centering means, pendulum means for sensing lateral accelerations of the vehicle, and a third valve in fluid circuit with said source and having fluid connection with said control valve, said third valve being governed by said pendulum means and operating when displaced to set up a fluid pressure additive with respect to the fluid pressure in said fluid pressure centering means.

5. In an automative vehicle comprising power steering apparatus including a source of fluid pressure, a fluid motor operably connected to a steering part and a control valve in the fluid circuit between said source and said motor, said control valve including an axially movable spool element having fluid pressure centering means at either end thereof, a manually actuated valve having fluid connection with said control valve, said manually actuated valve controlling said control valve through said fluid connection and comprising an axially movable spool element having fluid pressure feel means at either end thereof, the fluid pressures in said feel means at any time being a function of the fluid pressures in said fluid pressure centering means, means for sensing a selected motion of the vehicle in operation, and third valve means in fluid circuit with said source and having fluid connection with said control valve, said third valve means being governed by said sensing means and serving in operation of the vehicle to set up fluid pressures tending to center said control valve spool.

6. In an automotive vehicle comprising power steering apparatus including a source of fluid pressure, a fluid motor operably connected to a steering part and a control valve in the fluid circuit between said source and said motor, said control valve including an axially movable spool element having fluid pressure centering means at either end thereof, a manually actuated valve having fluid connection with said control valve, said manually actuated valve controlling said control valve through said fluid connection and comprising an axially movable spool element having fluid pressure feel means at either end thereof, the fluid pressures in said feel means at any time being a function of the fluid pressures in said fluid pressure centering means, pendulum means for sensing lateral accelerations of the vehicle, and third valve means in fluid circuit with said source and having fluid connection with said control valve, said third valve means incorporating a pair of axially aligned and displaceable spool elements operably connected to said pendulum means and serving in operation of the vehicle to set up fluid pressures tending to center said control valve spool.

7. In an automative vehicle comprising dirigible means a steering shaft operably connected to such means, said vehicle being equipped with power steering apparatus including a source of fluid pressure, a fluid motor operably connected to said dirigible means and a control valve in the fluid circuit between said source and said motor incorporating an axially movable spool element having fluid pressure centering means at either end thereof, a second valve in fluid circuit with said source and having fluid connection with said control valve, said second valve reacting to torque manually applied to turn said steering shaft, such turning being accompanied by axial displacement of said shaft and said second valve, the latter controlling said control valve through its fluid connection therewith and incorporating an axially movable spool element having fluid pressure feel means at either end thereof in which the fluid pressures at any time are a function of the fluid pressures in said fluid pressure centering means, pendulum means for sensing lateral accelerations of the vehicle, and a third valve in fluid circuit with said source and having fluid connection with said control valve, said third valve incorporating a pair of axially movable spool elements governed by said pendulum means and serving in operation of the vehicle to set up fluid pressures tending to center said control valve spool, said pendulum-governed spool elements being axially aligned and having centering means associated therewith.

8. The combination according to claim 7 where said pendulum means has fluid damping means associated therewith.

9. In an automotive vehicle comprising power steering apparatus including a source of fluid pressure, a fluid motor operably connected to a steering part and a control valve in the fluid circuit between said source and said motor, said control valve comprising an axially movable spool element having a plurality of pressure-responsive plungers at either end thereof including first and second pairs of opposed centering plungers and a pair of opposed actuating plungers, a second valve in circuit with said source and comprising a manually actuated spool element having fluid pressure feel means at either end thereof in which the fluid pressures at any time are a function of the fluid pressures behind said first pair of centering plungers, said second valve further having a pair of conduits extending therefrom and leading to said pair of actuating plungers, means for sensing a selected motion of the vehicle in operation, and third valve means in fluid circuit with said source and governed by said motion-sensing means, said third valve means having a pair of fluid conduits extending therefrom to said second pair of centering plungers.

10. The combination of claim 9 where said means governing said third valve means is a pendulum adapted to sense lateral accelerations of the vehicle.

References Cited in the file of this patent

UNITED STATES PATENTS

| 2,020,951 | Lemon | Nov. 12, 1935 |
| 2,252,660 | Kulikoff | Aug. 12, 1941 |
| 2,487,618 | Twyman | Nov. 8, 1949 |
| 2,506,093 | MacDuff | May 2, 1950 |
| 2,512,979 | Strother | June 27, 1950 |
| 2,608,263 | Garrison | Aug. 26, 1952 |
| 2,743,941 | Walker | May 1, 1956 |
| 2,748,881 | Holley | June 5, 1956 |
| 2,757,938 | Crowder | Aug. 7, 1956 |
| 2,760,590 | Stolte | Aug. 28, 1956 |

FOREIGN PATENTS

| 518,848 | Great Britain | Mar. 8, 1940 |